(12) United States Patent
Grieves et al.

(10) Patent No.: US 8,972,323 B2
(45) Date of Patent: Mar. 3, 2015

(54) STRING PREDICTION

(75) Inventors: Jason Grieves, Redmond, WA (US); Dmytro Rudchenko, Bellevue, WA (US); Parthasarathy Sundararajan, Bellevue, WA (US); Tim Paek, Sammamish, WA (US); Itai Almog, Redmond, WA (US); Songming Ho, Yokohama (JP); Jerome Turner, Kobe (JP); Masahiro Ami, Tokyo (JP); Kozo Miyano, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 13/517,615

(22) Filed: Jun. 14, 2012

(65) Prior Publication Data
US 2013/0339283 A1 Dec. 19, 2013

(51) Int. Cl.
| | | |
|---|---|---|
| *G06F 3/00* | (2006.01) | |
| *G06N 5/02* | (2006.01) | |
| *G06F 9/44* | (2006.01) | |
| *G06F 3/0482* | (2013.01) | |
| *G06F 3/0489* | (2013.01) | |

(52) U.S. Cl.
CPC ............ *G06F 9/4446* (2013.01); *G06F 3/0482* (2013.01); *G06F 3/04895* (2013.01); *G06N 5/02* (2013.01)
USPC ............................................ 706/46; 715/706

(58) Field of Classification Search
CPC ..................... G06F 3/0482; G06F 3/04895
See application file for complete search history.

(56) References Cited

U.S. PATENT DOCUMENTS

| | | | |
|---|---|---|---|
| 7,487,145 B1 * | 2/2009 | Gibbs et al. ........................... 1/1 |
| 7,499,940 B1 * | 3/2009 | Gibbs ................................... 1/1 |
| 7,836,044 B2 * | 11/2010 | Kamvar et al. ............... 707/713 |
| 2005/0017954 A1 * | 1/2005 | Kay et al. ...................... 345/169 |
| 2009/0193334 A1 | 7/2009 | Assadollahi |
| 2009/0225034 A1 | 9/2009 | Kida et al. |
| 2010/0064322 A1 | 3/2010 | Uno |
| 2010/0121876 A1 | 5/2010 | Simpson et al. |
| 2011/0035209 A1 | 2/2011 | Macfarlane |
| 2011/0041177 A1 * | 2/2011 | Pereira ............................. 726/20 |
| 2011/0078563 A1 | 3/2011 | Archer |
| 2011/0201387 A1 | 8/2011 | Paek et al. |
| 2011/0202876 A1 | 8/2011 | Badger et al. |
| 2011/0270786 A1 | 11/2011 | Badger et al. |

OTHER PUBLICATIONS

"CareAce's 2011-2012 Top 10 Android Keyboard Power Ranking", Retrieved at <<http://www.careace.net/2012/01/17/careace-top-10-best-android-keyboard-ranking-comparison-2011-2012-swiftkey-swype-go-ai-perfect-slideit/#T1>> Jan. 17, 2012, p. 17.

* cited by examiner

*Primary Examiner* — Stanley K Hill
(74) *Attorney, Agent, or Firm* — Jim Banowsky; Kate Drakos; Micky Minhas

(57) ABSTRACT

In a mobile device, the text entered by users is analyzed to determine a set of responses commonly entered by users into text applications such as SMS applications in response to received messages. This set of responses is used to provide suggested responses to a user for a currently received message in a soft input panel based on the text of the currently received message. The suggested responses are provided before any characters are provided by the user. After the user provides one or more characters, the suggested responses in the soft input panel are updated. The number of suggested responses displayed to the user in the soft input panel is limited to a total confidence value to reduce user distraction and to allow for easier selection. An undo feature for inadvertent selections of suggested responses is also provided.

12 Claims, 11 Drawing Sheets

710

1200

STRING PREDICTION

BACKGROUND

Typing is an essential part of many common scenarios on a mobile device including writing a text message, writing an email, searching for a contact, and typing a URL, for example. Typing on a mobile device can be slow and frustrating. This can be especially true when using an on screen software keyboard.

One solution to this problem is known as a soft input panel. In a soft input panel, a region of the screen displays suggested word predictions based on the characters that a user has entered so far into a text input field. The suggested words change as the user continues to enter characters into the field. When the user sees a word prediction that matches the word that they are entering, the user may select the word prediction and the selected word is placed in the text input field as a replacement for the characters entered by the user.

There are several drawbacks associated with current implementations of the soft input panel. One such drawback is that the predictions are limited to single words, rather than phrases or sentences. For example, if a user types "Th" into the text field, the soft input panel may predict "Thanks", rather than "Thank You!" or "Thank you very much!", forcing the user to enter additional characters.

A similar drawback is that the predictions are based only on the characters entered by the user and fail to take into account the typing history of the user, or other users. For example, if a user in the past has said "You are Welcome!!" in response to a short message service (SMS) message of "Thank you", the soft input panel does not display "You are Welcome!!" as a prediction even though the user may have selected such a prediction if offered.

Another drawback associated with soft input panels is that that they display too many predictions, which can be distracting for a user, and can make the correct prediction hard to select. For example, the user may have entered the characters "ye" and may be provided several candidate predictions including "yes", "yesterday", yeast", and "yet", even though "yes" may be the most likely prediction and "yesterday" and "yeast" are very unlikely. By displaying less likely predictions, the user is forced to consider more predictions before selecting "yes", and the risk of the user accidentally incorrectly selecting a prediction is increased. Because the soft input panel does not offer an undo feature, mis-selecting a prediction can be very frustrating—forcing the user to delete the prediction and reenter the original characters.

SUMMARY

In a mobile device, a history of text entered by users is analyzed to determine a set of phrases commonly entered by users into text applications as responses to other commonly received phrases or strings. This set of phrases is then used to provide suggested phrases to a user for a currently received message in a soft input panel when the text of the currently received message includes one of the common phrases or strings in the set. The suggested phrases are provided before any characters are provided by the user. After the user provides one or more characters, the suggested phrases in the soft input panel are updated. The number of suggested phrases displayed to the user in the soft input panel is limited to a total confidence value to reduce user distraction and to allow for easier selection. An undo feature for inadvertent selections of suggested phrases is also provided.

In an implementation, a string is received from an application at a computing device. String predictions are generated based on the received string by the computing device. Each string prediction includes a string and a confidence value and each string may be a phrase that has been previously entered in response to the received string. One or more of the strings of the string predictions are provided according to the associated confidence values by the computing device. An indication of selection of one of the provided strings is received by the computing device. In response to the indication of selection, the selected string is provided as an input to the application by the computing device.

In an implementation, a first character is received by a computing device. First string predictions are determined based on the first character by the computing device. Each of the first string predictions includes a string and an associated confidence value. The strings of the first string predictions are displayed on a display of the computing device. Each of the strings is displayed at a location on the display according to the confidence value associated with each of the strings. A second character is received by the computing device. Second string predictions are determined based on the first character and the second character by the computing device. The strings of the second string predictions are displayed. Each string of the second string predictions that is also in the strings of the first string predictions is displayed at the same location as the string of the string predictions.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
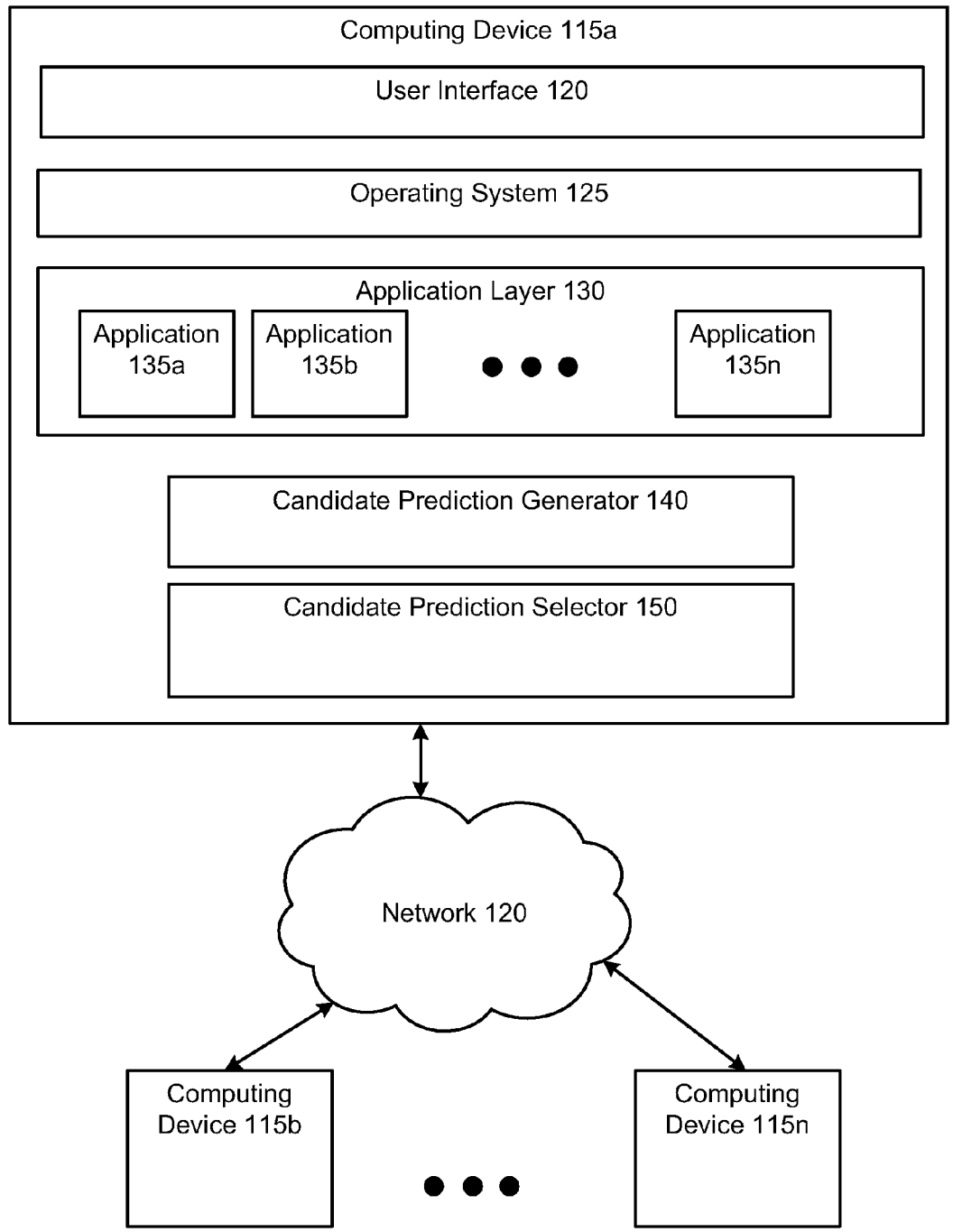
FIG. 1 is an illustration of an example environment for the selection and presentation of string predictions.

FIG. 1 is an illustration of an example environment 100 for the selection and presentation of string predictions. The environment 100 may include a plurality of computing devices 115 (e.g., computing devices 115a-n). The computing devices 115 may be a variety of computing devices including mobile devices such as cell phones, smart phones, portable media players, game consoles, and the like. The computing devices 115 may communicate with one another through a network 120. The network 120 may be a variety of network types including the public switched telephone network (PSTN), a cellular telephone network, and a packet switched network (e.g., the Internet). Examples of suitable computing devices 115 include the computing system 1200 described with respect to FIG. 12.

Each computing device 115 may include an operating system 125 and a user interface 120. The operating system 125 may include a variety of well known operating systems. A user of the computing device 115 may use the user interface 120 to input one or more characters to the operating system 125. The user interface 120 may include a variety of interfaces including a software or hardware keyboard, for example.

Each computing device 115 may further execute one or more application 135 (e.g., applications 135a-n). The applications 135 may be executed in an application layer 130. The applications 135 may include email applications, message service (SMS) or text applications, chat applications, and word processing applications, for example. The computing devices 115 may exchange text-based messages using the applications 135. For example, each computing device 115 may execute an SMS application and may send and receive SMS messages through the application 135.

The users of the computing devices 115 may interact with the applications 135 through the user interface 120 and the operating system 125. More specifically, a user may enter characters through the user interface 120. The entered characters may be received by the operating system 125, and may be provided to one or more of the applications 135.

As described above, the process of entering text character by character into the user interface 120 may be frustrating for users of the computing devices 115. Accordingly, the computing device 115 may further include a candidate prediction generator 140. The candidate prediction generator 140 may generate one or more string predictions. A string prediction may include a string that the candidate prediction generator 140 predicts that a user intends to enter into the user interface 120. The string prediction may further include a confidence value for the string. The predicted string may include any sequence of one or more characters including, but not limited to, words, phrases, sentences, emoticons, punctuation marks or other symbols, or combinations thereof.

Figure 2:
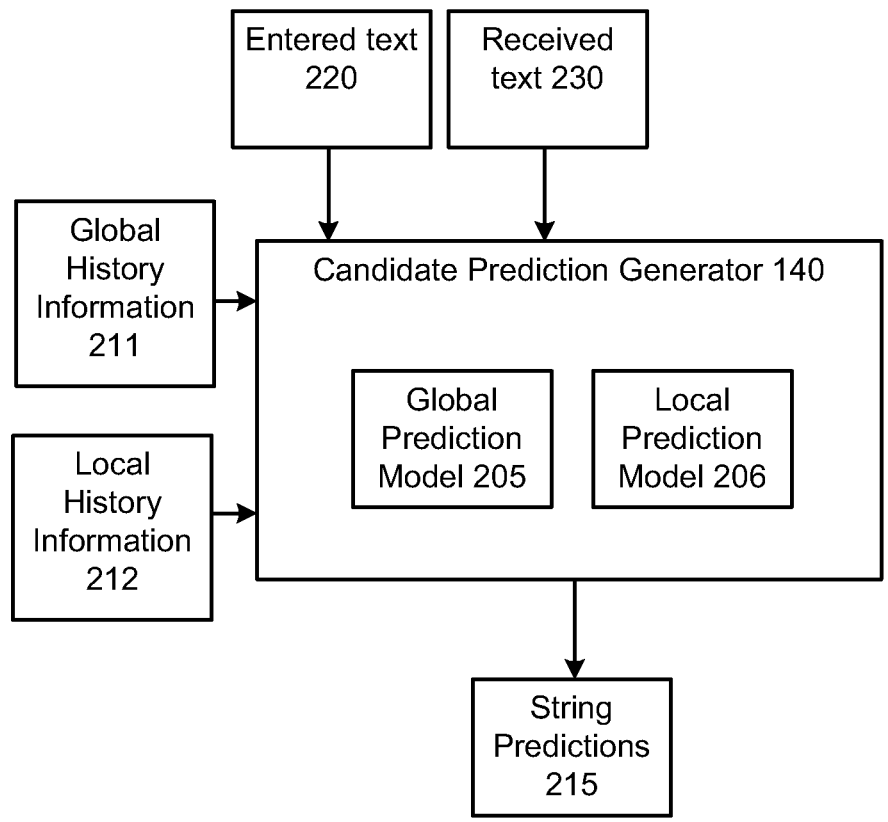
FIG. 2 is an illustration of a candidate prediction generator.

As described further with respect to FIG. 2, the predictions may be based in part on historical information collected about the user and/or other users. The historical information may include a history of text information entered by the users along with the corresponding text information entered by other users that the users may have been interacting with. For example, the historical information may include the text of conversations that a user had via SMS applications, chat applications, and/or email applications.

The historical information may be global information collected from multiple users across multiple computing devices 115, or may be local information that is specific to a particular user or computing device 115. In some implementations, a user may be asked to "opt-in" or otherwise consent to have their text information included in the historical information. In addition, the information may be obscured so that the identity of a user may not be determined based on the text information.

The historical information may be used by the candidate prediction generator 140 to generate one or more candidate string predictions based the historical information and information about the text that the user has entered or text that the user is responding to. The strings may be phrases that have been previously entered in response to the text that the user is responding to. For example, if the user receives a text that says "How are you?", the candidate prediction generator 140 may use the historical information to predict that the user is likely to respond by entering the string prediction "Fine, thanks for asking." Thus, unlike current solutions, the candidate prediction selector 140 may generate candidate predictions even when no text has been entered by the user into the user interface 120. If the user later enters the character "l", the candidate prediction generator 140 may restrict the string predictions to those strings that begin with the character "l".

The computing device 115 may further include a candidate prediction selector 150 that controls how the candidate string predictions that are generated by the candidate prediction generator 140 are displayed or provided to a user. As described further with respect to FIG. 3, the candidate prediction selector 150 may reduce the overall number of candidate string predictions that are displayed by selecting a confidence threshold and displaying a minimum subset of the string predictions whose confidence value sum is greater than or equal to the confidence threshold. The candidate prediction selector 150 may further control the location and placement of the string predictions that are displayed, as well as the location and placement of the candidate string predictions as they are refined or adjusted based on characters provided by the user to the user interface 120.

In some implementations, the candidate prediction selector 150 may also provide what is referred to herein as "undo" functionality. When a user selects a string prediction, the candidate prediction selector 150 may store the string predictions that were displayed to the user along with the character(s) that the user has entered thus far into the user interface 120. If the user provided an indication that they want to undo the selected candidate string prediction, the candidate prediction selector 150 may retrieve the stored candidates and character(s), redisplay the retrieved stored candidates to the user, and re-enter the retrieved character(s) into the user interface 120.

FIG. 2 is an illustration of an example candidate prediction generator. In some implementations, the candidate prediction generator 140 may generate string predictions 215 using one or more models. As shown, the candidate prediction generator 140 includes a global prediction model 205 and a local prediction model 206. The global prediction model 205 may be a model that generates one or more string predictions 215 based on global history information 211, and the local history model 206 may be a model that generates one or more string predictions 215 based on local history information 212. The global history information 211 may include text entered and received by a variety of computing devices 115, while the local history information 212 may be limited to the text entered and received by a user or users associated with the computing device that includes the candidate prediction generator 140. Both the global prediction model 205 and the local prediction model 206 may be created by the candidate prediction generator 140 using the local history information 212 and the global history information 211, or may be received by the candidate prediction generator 140 from an administrator, for example, depending on the implementation. For example, a server may collect information from a variety of computing devices 115 over a period of time, and may generate the global prediction model 215 from the collected information.

Other types of models may also be supported by the candidate prediction generator 140. For example, the candidate prediction generator 140 may include language specific models such as Spanish, Japanese, or German models. The models may be specific to different countries, states, regions, or cities, for example. The models may also be application 135 specific. Thus, the candidate prediction generator 140 may include a model that may be used to generate string predictions for SMS applications, a model that may be used to generate string predictions for email applications, and a model that may be used to generate string predictions for chat applications, for example.

In some implementations, the models 205 and 206 may be used by the candidate prediction generator 140 to generate string predictions based on received text 230. The received text 230 may be a string and may be comprise some or all of the text that has been received from an application 135. For example, where the application 135 is an SMS application, the received text 230 may be the last text or SMS message that was received from a user. Similarly, where the application 135 is an instant message application, the received text 230 may be last instant message received, or some subset of the instant messages received from a user or during a conversation.

In some implementations, the string predictions 215 may comprise a string and a confidence value. The confident value may be determined by the model used to generate the string prediction, and may be a measure of how confident that the model is that the string prediction is correct.

In some implementations, the models 205 and 206 may be static models. The static models may include strings, and one or more string predictions 215 that may be generated when received text 230 that matches or approximately matches the strings is received. For example, Table 1 may be used by the global prediction model 205:

TABLE 1

| Received Text 230 | String Predictions 215 |
|---|---|
| I love you | I love you too |
| Goodnight | Goodnight |
| Good morning | Good morning |
| I feel sick | I hope you feel better! |
| Thanks | You're welcome OR No problem! |
| I'm sorry | It's ok |
| Hey | Hi! OR What's up? |
| Are you sure? | Yes OR No |
| What time are you going? | I'm going at [TIME] |

For example, when the received text is "I love you", the candidate prediction generator 140 may provide the string prediction of "I love you too". As shown, some of the received text 230 entries have multiple string predictions 215. For these entries, the candidate prediction generator 140 may provide all of the string predictions 215. For example, when the received text 230 is "Are you sure?", the candidate prediction generator 140 may provide both of the string predictions 215 "Yes" and "No".

In some implementations, when the received text 230 includes any of the strings in the model as a substring, then the candidate prediction generator 140 also provides the corresponding string predictions 215. For example, if the received string 230 is "Hello Albert, I love you very much", then the candidate prediction generator 140 may provide the string prediction of "I love you too", because the string "I love you" is a substring of the string "Hello Albert, I love you very much". Alternatively or additionally, the candidate prediction generator 140 may provide a string prediction when the received text 230 is similar to one or more of the strings. For example, if the received string is "Luv U", then the candidate prediction generator 140 may provide the string prediction of "I love you too", because "Luv U" is similar to "I love you". Any method for comparing and determining the similarity of strings may be used.

In some implementations, one or more of the string predictions 215 may further include one or more fields. A field may be placeholder for the user to provide additional text to complete the string prediction 215. For example, when the received text 230 is "What time are you coming?", the candidate prediction generator 140 may provide the string prediction "I'm going at [TIME]". If the user later selects that string prediction, the user may be prompted to provide a time to complete that string prediction by the user interface 120.

With respect to the local prediction model 206, the candidate prediction generator 140 may periodically or continuously update the model 206 based on the text entered and received by a user of the computing device 115 as provided in the local history information 212. For example, if the local history information 212 indicates that on two or more occasions when the user received the text "May the force be with you", the user entered the text "And also with you", the entered text may be added to the model 206 as a string prediction 215 for the received text 230 "May the force be with you".

With respect to the global prediction model 205, the candidate prediction generator 140 may periodically or continuously provide the collected local history information 212 to a server or other repository for the local history information 212. The repository may combine the collected local history information 212 to generate the global history information 211, which may be provided to the candidate prediction generators of the computing devices 115.

In some implementations, the candidate prediction selector 140 may further generate string predictions 215 based on entered text 220. Unlike the received text 230 which is text that was received from another user, the entered text 220 may be one or more characters that the user has provided to the user interface 120. For example, if a user receives an SMS message "Thanks", and begins to type a response into a text field of the user interface 120 by entering the character "Y", then the received text 230 is the string "Thanks", and the entered text 220 is the character "Y".

The received text 230 may be used by the candidate prediction generator 140 to narrow or focus the string predictions 215. More specifically, any string predictions 215 generated by the models 205 and 206 may have the entered text 220 as a prefix. For example, referring to the table above, if the received text 230 is "Thank You", and the entered text is "Y", then the candidate prediction generator 140 may only generate the candidate string prediction 215 "You're welcome", rather than both "No problem!" and "You're welcome" because "Y" is not a prefix of the string "No problem!".

Figure 3:
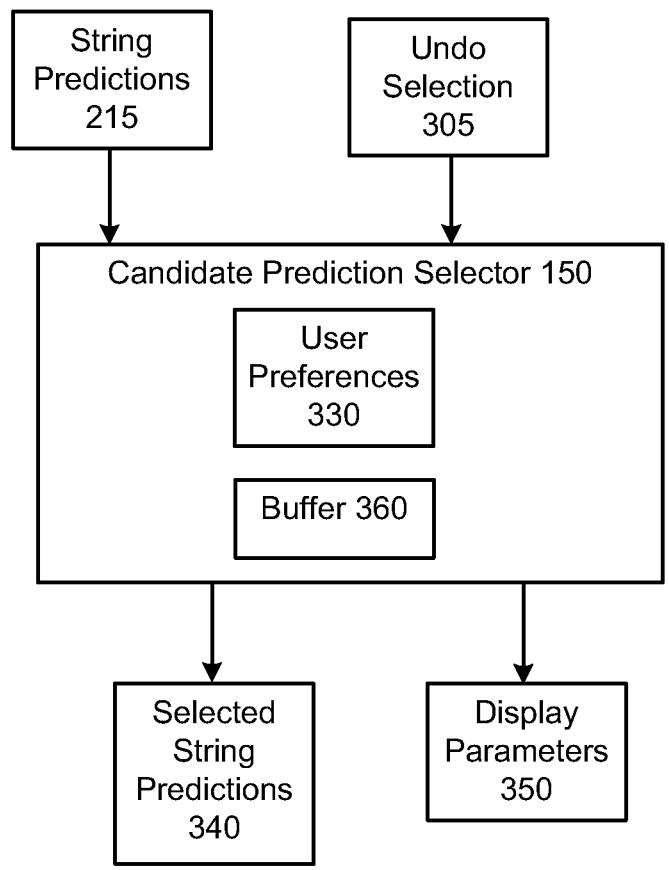
FIG. 3 is an illustration of a candidate prediction selector.

FIG. 3 is an illustration of the candidate prediction selector 150. The candidate prediction selector 150 may receive the string predictions 215 from the candidate prediction generator 140 and may select a subset of the string predictions 215 to display and/or provide to a user as the selected string predictions 340. In some implementations, the candidate prediction selector 150 may select the selected string predictions 340 according to user preferences 330. The user preferences 330 may specify a maximum (or minimum) number of string predictions to include in the selected string predictions 340 and/or may specify a minimum confidence value for a string prediction to be included in the selected string predictions 340.

In some implementations, the candidate prediction selector 150 may select the string predictions 215 for the selected string predictions 340 according to the associated confidence values. For example, the candidate prediction selector 150 may select the string predictions with the highest confidence values up to the user specified maximum number of string predictions 215.

Alternatively or additionally, the candidate prediction selector 150 may select the string predictions 215 for the selected string predictions 340 in such a way as to minimize the number of string predictions selected while maximizing a sum of the confidence values using a confidence value threshold. For example, the set of string predictions 215 may include fifteen string predictions. A first string prediction 215 may have a confidence value of 73%, a second string prediction 215 may have a confidence value of 21%, and the remaining string predictions may have confidence values of less than 1%. Because the sum of the confidence values of the first and second string predictions is high, the candidate prediction selector 150 may limit the selected string predictions 340 to the first and second string predictions 215. Displaying the other string predictions to the user offers little benefit to the user because they are unlikely to be chosen, and may in fact be detrimental because they may be distracting to the user and may lead to inadvertent selections.

Accordingly, in some implementations, the user preferences 330 may include a confidence value threshold. The candidate prediction selector 140 may then select string predictions 215 for the selected string predictions 340 until a sum of the confidence values of the selected string predictions 340 is greater than or equal to the confidence value threshold. The confidence value threshold may be variety of values including 70%, 80%, 90%, etc. In some implementations, the candidate prediction selector 150 may select the smallest subset of the string predictions 215 that has a confidence value sum that is greater than or equal to the confidence value threshold.

In some implementations, the user preferences 330 may further specify a minimum confidence value for any string prediction included in the selected string predictions 340. For example, the minimum confidence value may be 40%. Thus, if no string prediction has a confidence value that is above 40%, then the selected string predictions 340 may be empty.

The candidate prediction selector 140 may further generate display parameters 350 that may be used by the operating system 125 to display the selected string predictions 340 to the user. The display parameters 350 may include screen locations and fonts (including color and size) for example, and may be based in part on the user preferences 330. For example, the user may specify the font or color to use to display the selected string predictions 340.

In some implementations, the selected string predictions may be displayed in a user interface element such as a soft input panel. The soft input panel may be displayed to a user proximate to a text entry field that the user enters characters to the user interface 120. For example, the soft input panel may be displayed directly below the text entry field.

Figure 4A:
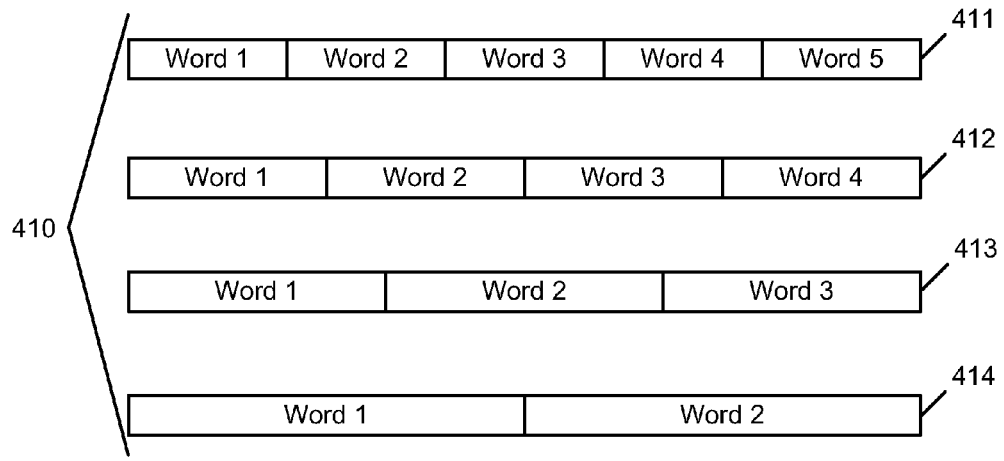
FIGS. 4A and 4B are illustrations of example string predictions and soft input panels.

The display parameters 350 may indicate how the selected string predictions 340 may be placed in the soft input panel. The placement of the selected string predictions 340 in the soft input panel may depend on the number of selected string predictions 340. For example, reference numeral 410 of FIG. 4A shows four example placements of string predictions in soft input panels 411, 412, 413, and 414. The soft input panel 411 includes five words placed in five equal sized regions, the soft input panel 412 includes four words placed in four equal sized regions, the soft input panel 413 includes three words placed in three equal sized regions, and the soft input panel 414 includes two words placed in two equal sized regions. In the examples shown, the predicted words are centered with respect to their regions; however, in some implementations the words may be aligned to the left or the right depending on the language and/or the user preferences 330.

In some implementations, the string predictions are placed in the soft input panel such that as the user continues to provide characters to the user interface 120, the locations of the string predictions remain at approximately the same locations in the soft input panel. By displaying the string predictions at approximately the same locations, the changes to the soft input panel is minimized as the user continues to provides characters which may reduce visual distractions for the user.

For example, referring to reference numeral 410 of the FIG. 4A again, the soft input panel 411 may represent an initial layout of the selected string predictions 340. As the user enters characters, the number of selected string predictions 340 may be reduced because one or more of the strings may be invalid based on the characters entered so far. The predictions windows 412, 413, and 414 show how the strings presented in the soft input panel change as the user enters characters. As can be seen, the location of strings such as "Word 1" and "Word 2" remain approximately the same in the soft input panel as characters are received from the user.

Figure 4B:
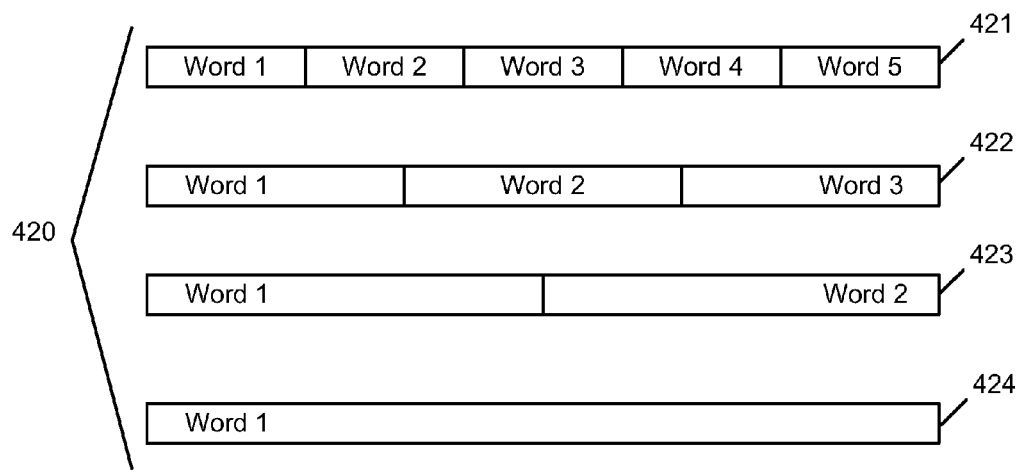

In other implementations, rather than placing the string predictions in approximately the same locations in the soft input panel, one or more of the selected string predictions 340 may be placed in fixed locations in the soft input panel. Reference number 420 of FIG. 4B shows four sample soft input panels 421, 422, 423, and 424. The soft input panel 421 shows the initial locations of the selected string predictions 340. The predictions windows 422, 423, and 424 show how the strings presented in the soft input panel change as the user enters characters. As can be seen, the location of the string "Word 1" remains in exactly the same fixed position in the soft input panel as characters are received from the user.

The candidate prediction selector 150 may further include a buffer 360. The buffer 360 may be used to provide undo functionality to the user interface 120 and the soft input panel. The buffer 360 may be used by the candidate prediction selector 150 to store one or more characters received from the user interface 120 through the text field along with the selected string predictions 340 that have been presented to a user in the soft input panel.

When a user selects a string prediction from the soft input panel, the selected string prediction is used to complete, or overwrite, the characters provided by the user so far in the text field, and the string predictions are removed from the soft input panel. If the user incorrectly selected the string prediction, the user may provide an undo selection 305 to reverse the selection of the string prediction. In response to the undo selection 305, the candidate prediction selector 150 may retrieve the string predictions and provided characters from the buffer 360. The candidate prediction selector 140 may redisplay the retrieved string in the soft input panel, and restore the provided characters to the text field.

The undo selection 305 may be made using a variety of selection methods. For example, the undo selection 305 may be activated by the user selecting a user interface element such as an undo button. In another example, the undo selection 305 may be made by the user selecting the selected string prediction after it is displayed in the text field. In another example, the undo selection 305 may be made through a gesture, or by the user shaking the computing device 115. In some implementations, the operation of the undo selection 305 may be configured by the user in the user preferences 330.

Figure 5:
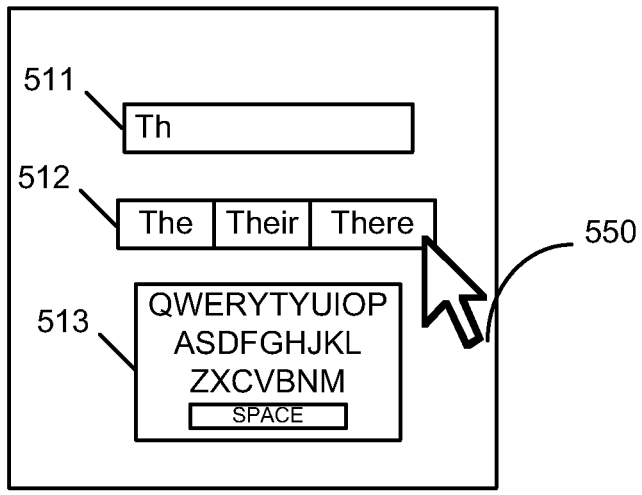
FIGS. 5-7 are example screen shots of an example user interface implementing an undo feature.
Figure 6:
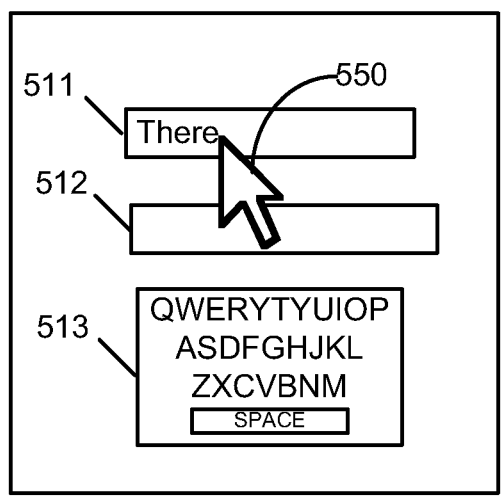
Figure 7:
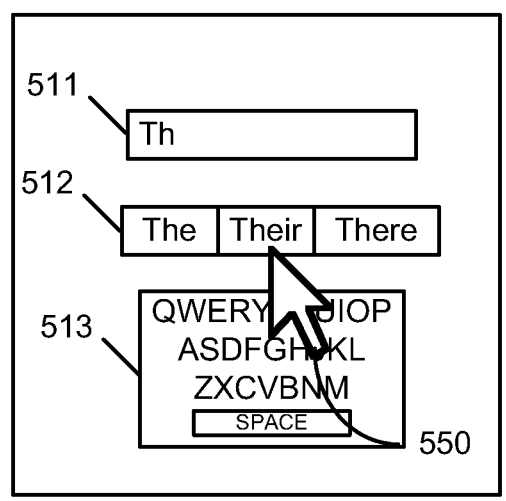

For example, FIGS. 5-7 are example screen shots 510, 610, and 710 of an example user interface implementing the undo feature described herein. As shown in the screen shot 510, a user has entered the string "Th" into a text field 511 using a software keyboard 513. In response to the entered string, the candidate prediction selector 150 has provided three string predictions in a soft input panel 512. The string predictions are "The", "Their", and "There". As represented by the arrow 550, the user has selected the string prediction "There." In response to the selection, the candidate prediction selector 150 may store the contents of the soft input panel 512 and the text field 511 to the buffer 360.

The screen shot 610 of FIG. 6 shows the updated user interface 120 in response to the selection described with respect to FIG. 5. The string "Th" has been replaced by the selected string "There" in the text field 511, and the contents of the soft input panel 512 have been cleared. However, after making the selection of the string prediction "There", the user may decide that the selection was made in error, and would rather have selected the string prediction "Their". Accordingly, the user may generate an indication to undo the previous string selection. In the example shown, the user may provide the indication by selecting the string "There" in the text field 511. In response to the selection, the user interface 120 may provide an undo selection 305 to the candidate prediction selector 150.

Upon receiving the undo selection 305, the candidate prediction selector 140 may retrieve the stored contents of the soft input panel 512 and the text field 511 from the buffer 360 and restore the soft input panel 512 and the text field 511 to their pre-selection states. The screen shot 710 of FIG. 7 shows the updated user interface. The text field 511 and the soft input panel 512 have the same contents as in the screen shot 510. The user may now select the string prediction "Their" as represented by the arrow 550.

Figure 8:
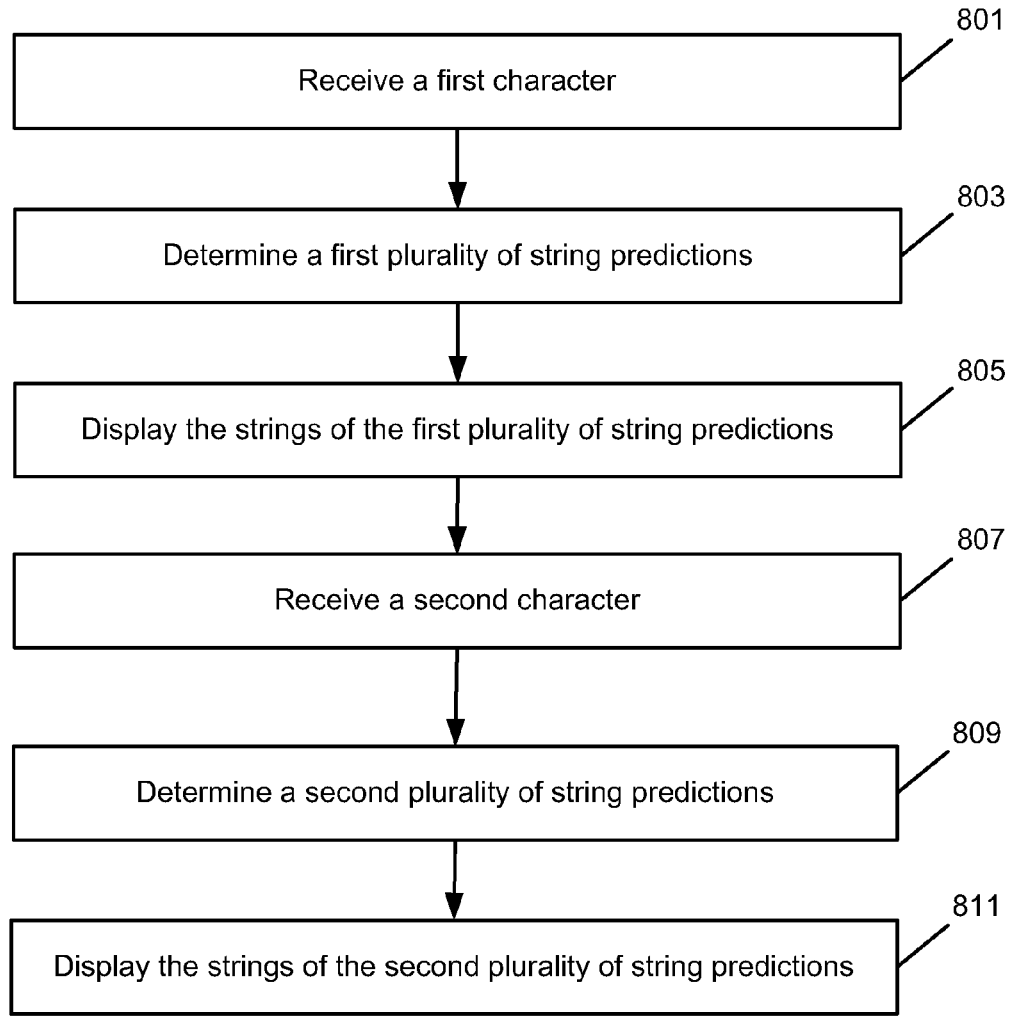
FIG. 8 is an operational flow of an implementation of a method for providing string predictions.

FIG. 8 is an operational flow of an implementation of a method 800 for providing string predictions. The method 800 may be implemented by a candidate prediction generator 140 and/or a candidate prediction selector 150 of a computing device 115, for example.

A first character is received at 801. The first character may be received by the candidate prediction generator 140 through a text field of a user interface 120. For example, a user may use a software keyboard to enter the first character into a text field. The first character may be the first character of a string that the user wants to enter into an application 135.

A first plurality of string predictions is determined at 803. The first plurality of string predictions may be determined by the candidate prediction generator 140 using one or more models such as the global prediction model 205 and the local prediction model 206. Each string prediction may include a string and a confidence value. The string predictions may include complete sentences. In some implementations, each string may be a phrase that has been previously entered by the user or other users.

The strings of the first plurality of string predictions are displayed at 805. The strings may be displayed by the candidate prediction selector 150 according to the user preferences 330 in a soft input panel. All of the strings of the first plurality of string predictions may be displayed in the soft input panel, or just a subset of the strings may be displayed. The strings may each be displayed in a location in the soft input panel according to the confidence values associated with the strings. For example, the string with the greatest associated confidence value may be displayed in a first location of the panel (e.g., left most or right most depending on the language), and the string with the least associated confidence value may be displayed in a last location of the panel.

A second character is received at 807. The second character may be received by the candidate prediction generator 140 through the text field of a user interface 120. The second character may be the second character of the string that the user wants to enter into the application 135.

A second plurality of string predictions is determined at 809. The second plurality of string predictions may be determined by the candidate prediction generator 140 using one or more models such as the global prediction model 205 and the local prediction model 206 and the first and the second characters. In some implementations, the second plurality of string predictions may be a subset of the first plurality of string predictions and may include strings from the first plurality of string predictions that include both the first and the second characters as a prefix.

The strings of the second plurality of strings are displayed at 811. The strings may be displayed by the candidate prediction selector 150 according to the user preferences 330 in the same soft input panel as the strings of the first plurality of strings. The strings of the second plurality of strings may be displayed in such a way that each string of the second plurality of string predictions that is also in the strings of the first plurality of string predictions is displayed at the same location that the string of the first plurality of string predictions was displayed at. Thus, for example, if the string "There" is in both the first and second plurality of strings, "There" is displayed in approximately the same location of the soft input panel when the second plurality of strings is displayed as it was when the first plurality of strings was displayed. The strings may be displayed in the same or approximately the same locations even if the number of strings in the first and the second plurality of strings are different.

Figure 9:
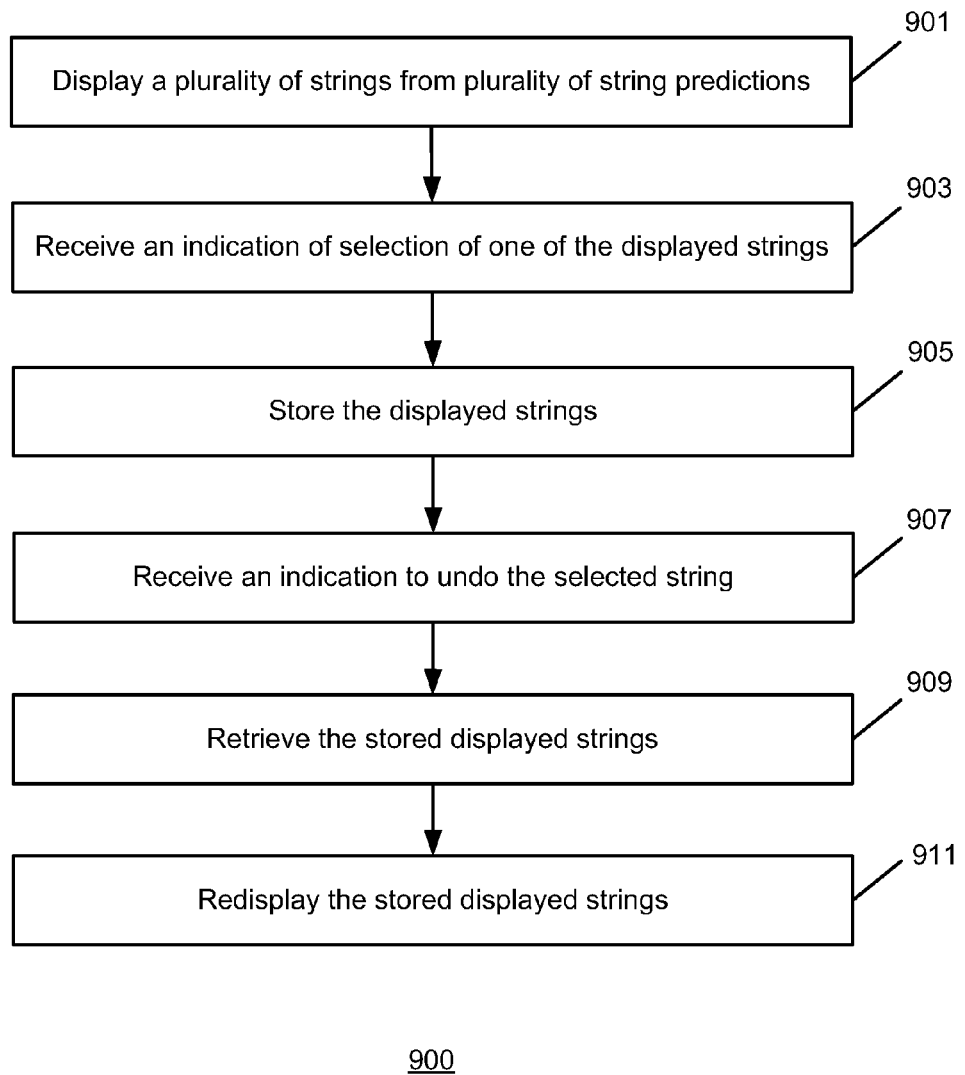
FIG. 9 is an operational flow of an implementation of a method for providing undo functionality.

FIG. 9 is an operational flow of an implementation of a method 900 for providing undo functionality. The method 900 may be implemented by the candidate prediction selector 150 of the computing device 115, for example.

A plurality of strings from a plurality of string predictions is displayed at 901. The plurality of strings may be displayed by the operating system 125 to a user in a soft input panel on a display of a computing device 115. The plurality of strings may be predicted strings and may have been generated based on entered text 220 by the user into a text field and/or received text 230 from another user. For example, the received text 230 may be an SMS message received from the another user. Each string may include a phrase that has been previously entered in response to the received text 230 by the user or other users. In some implementations, the plurality of strings may be displayed without any characters or entered text 220 having been provided by the user (i.e., based only on the received text 230).

An indication of selection of one of the displayed strings in received at 903. The indication of selection may be received by the user interface 120 from the user. For example, a user may have selected one of the displayed strings by touching the displayed string in the soft input panel. In response to the selection, the soft input panel may be cleared, and the selected string may replace the entered text 220 (if any) in the text field.

The plurality of displayed strings is stored at 905. The displayed strings may be stored by the candidate prediction selector 150 in a buffer 360. In addition, the contents of the entered text 220 (if any) may also be stored. The displayed strings (and entered text 220) may have been stored in the buffer 360 before or after the strings were displayed, or in response to the indication of selection.

An indication to undo the selected string is received at 907. The indication to undo the selected string may be the undo selection 305, and may be received by the candidate prediction selector 150 from the user interface 120. In some implementations, the user interface 120 may generate the undo selection 305 when a user selects the contents of the text field, or when the user selects an undo button or other user interface element.

The stored displayed strings are retrieved at 909. In response to the indication, the candidate prediction selector 150 may retrieve the stored displayed strings (and entered text 220 if any) from the buffer 360.

The stored displayed strings are redisplayed at 911. The stored displayed strings may be redisplayed by the operating system 125 in the soft input panel, for example. Any retrieved entered text 220 may also be redisplayed in the text field.

Figure 10:
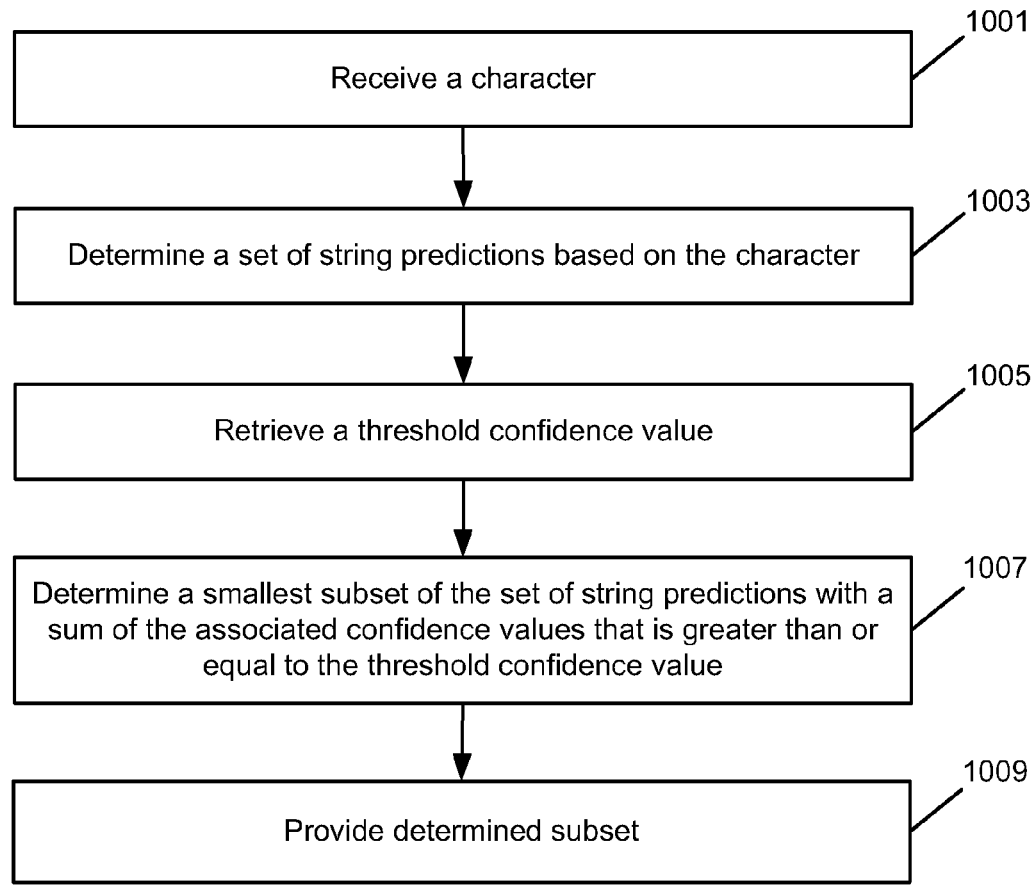
FIG. 10 is an operational flow of an implementation of a method for providing string predictions.

FIG. 10 is an operational flow of an implementation of a method 1000 for providing string predictions. The method 1000 may be implemented by a candidate prediction generator 140 and/or a candidate prediction selector 150 of a computing device 115, for example.

A character is received at 1001. The character may be received by the candidate prediction generator 140 from a user through the user interface 120. For example, the user may have entered a character into a text field using a software keyboard.

A set of string predictions is determined based on the character at 1003. The set of string predictions 215 may be determined by the candidate prediction generator 140 using the character and one or more models, such as the global prediction model 205 and/or the local prediction model 206. Each string prediction in the set of string predictions may include a string and a confidence value.

A threshold confidence value is retrieved at 1005. The threshold confidence value may be retrieved by the candidate prediction selector 150 from the user preferences 330. The threshold confidence value may represent a sum of the confidence values of the strings displayed to a user in a soft input panel. For example, a user may specify that the strings displayed in the soft input panel have a total confidence value of 90%. The user may then specify that a threshold confidence value of 90% in the user preferences 330.

A smallest subset of the set of string predictions with a sum of the associated confidence values that is greater than or equal to the threshold confidence value is determined at 1007. The smallest subset may be determined by the candidate prediction selector 150 as the selected string predictions 340. By selecting the smallest subset for the selected string predictions 340, the candidate prediction selector 150 may provide candidate strings with the greatest associated confidence values while also minimizing the number of string predictions that are displayed to a user.

The determined subset is provided at 1009. The determined subset may be provided by the candidate prediction selector 150 as the selected string predictions 340. The operating system 125 may display the strings of the determined subset to the user according to the display parameters 350.

Figure 11:
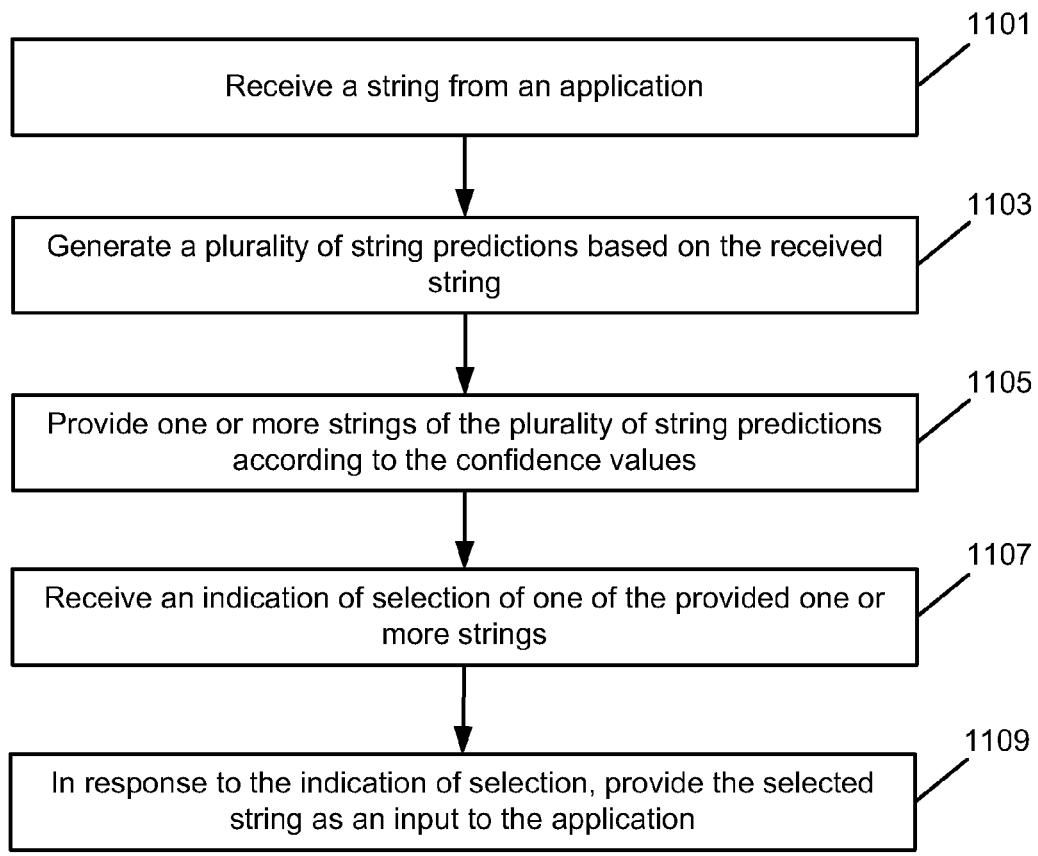
FIG. 11 is an operational flow of an implementation of a method for providing string predictions.

FIG. 11 is an operational flow of an implementation of a method 1100 for providing string predictions. The method 1100 may be implemented by a candidate prediction generator 140 and/or a candidate prediction selector 150 of a computing device 115, for example.

A string is received from an application at 1101. The string may be the received text 230 and may be received from an application 135 such as an SMS or email application by the candidate prediction generator 140 of the computing device 115. The string may be a text string that was provided by another user of a different computing device 115. The text string may be an SMS message that was sent by another user and received by the computing device 115. For example, the string may be "How are you feeling?"

A plurality of string predictions is generated based on the received string at 1103. The first plurality of string predictions may comprise the string predictions 215 and may be generated by the candidate prediction generator 140 using the received string and one or more of the global prediction model 205 and/or the local prediction model 206. In some implementations, the string predictions may include one or more sentences or phrases that were generating by matching or approximately matching the received text with received text in a table of mappings of received text to string predictions. The mappings may be based on historical information of text generated and received by one or more users. Continuing the example above, the string predictions may comprise words and phrases that were provided in response to strings similar to "How are you feeling?", such as "Fine", "I feel great", and "Good. Thanks." The string predictions may be generated before any characters are received from the user of the computing device.

One or more strings of the plurality of string predictions are provided according to the confidence values at 1105. One or more of the strings may be provided by the candidate prediction selector 150 to the operating system 125. The operating system 125 may then display the one or more strings in a soft input panel. For example, the strings "Fine" and "Good. Thanks." may be displayed in the soft input panel.

An indication of selection one of the provided one or more strings is received at 1107. The indication of selection may be received by the operating system 125 from the user interface 125. For example, the user may select the string "Good. Thanks."

The selected string is provided as an input to the application at 1109. The selected string may be provided to the application 135 by the operating system 125. For example, the selected string "Good. Thanks." may be provided to the SMS applications and sent as a text message to the user that provided the initial text message of "How are you feeling?".

Figure 12:
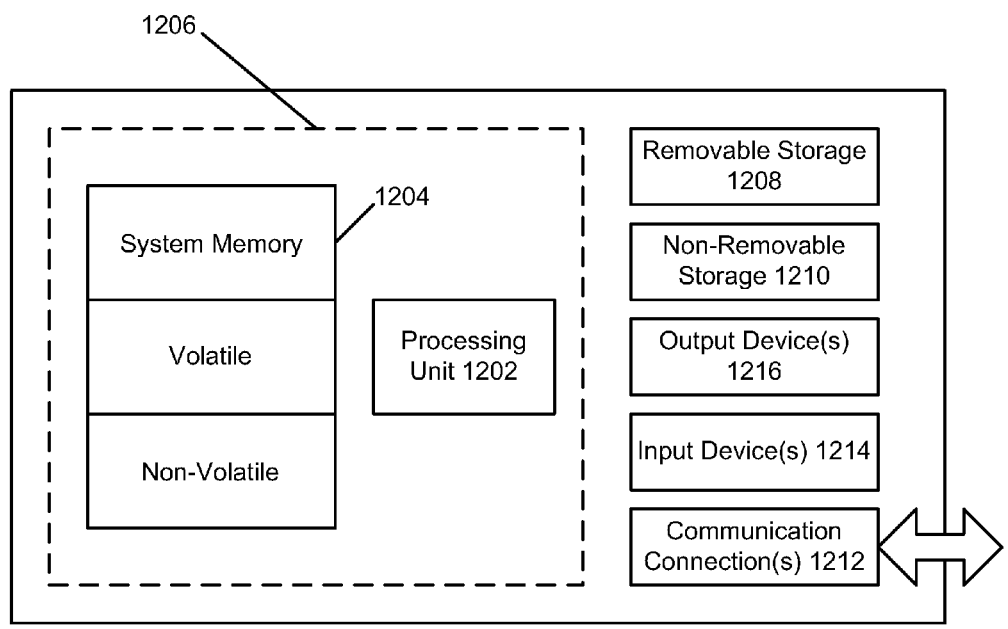
FIG. 12 shows an exemplary computing environment in which example embodiments and aspects may be implemented.

FIG. 12 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing system 1200. In its most basic configuration, computing system 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing system 1200 may have additional features/functionality. For example, computing system 1200 may include additional storage (removable and/or non-removable) including, but not limited to, magnetic or optical disks or tape. Such additional storage is illustrated in FIG. 12 by removable storage 1208 and non-removable storage 1210.

Computing system 1200 typically includes a variety of computer readable media. Computer readable media can be any available media that can be accessed by computing system 1200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 1200. Any such computer storage media may be part of computing system 1200.

Computing system 1200 may contain communication connection(s) 1212 that allow the device to communicate with other devices and/or interfaces. Computing system 1200 may also have input device(s) 1214 such as a keyboard (software or hardware), mouse, pen, voice input interface, touch interface, etc. Output device(s) 1216 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a string from an application at a first computing device;
   generating a first plurality of string predictions based on the received string by the first computing device, wherein each string prediction comprises a string and a confidence value and each string comprises a phrase that has been previously entered in response to the received string;
   providing one or more of the strings of the first plurality of string predictions according to the associated confidence values by the first computing device;
   receiving an indication of selection of one of the provided one or more strings by the first computing device; and
   in response to the indication of selection, providing the selected string as an input to the application by the first computing device.

2. The method of claim 1, wherein the first plurality of strings predictions is generated before a character is received from a user of the first computing device.

3. The method of claim 1, wherein generating the first plurality of string predictions based on the received string comprises generating the first plurality of string predictions based on the received string and at least one prediction model.

4. The method of claim 3, wherein the at least one prediction model is one or more of a local prediction model or a global prediction model.

5. The method of claim 1, wherein the string is received from the application at a second computing device.

6. The method of claim 1, wherein the one or more strings of the first plurality of string predictions comprise sentences.

7. The method of claim 1, further comprising:
   receiving a character;
   in response to the received character, generating a second plurality of string predictions based on the received string and the received character; and
   providing one or more of the strings of the second plurality of string predictions.

8. The method of claim 1, further comprising:
   storing the provided one or more strings of the first plurality of strings;
   receiving an indication to undo the selected string;
   in response to the indication to undo, retrieving the stored one or more strings from the first plurality of strings; and
   providing the retrieved one or more strings.

9. The method of claim 8, wherein the indication to undo comprises the selection of a user interface element or the selection of the provided selected string.

10. The method of claim 8, wherein the provided one or more strings are stored in a buffer.

11. The method of claim 1, wherein providing one or more of the strings of the first plurality of string predictions according to the associated confidence values comprises displaying one or more of the strings of the first plurality of string predictions according to the associated confidence values.

12. The method of claim 11, wherein displaying one or more of the strings of the first plurality of string predictions according to the associated confidence values comprises:
  retrieving a threshold confidence value;
  selecting the smallest subset of strings from the first plurality of strings whose associated confidence values has a sum that is greater than the threshold confidence value; and
  displaying the strings of the selected subset of strings.

* * * * *